US008847848B2

(12) United States Patent
Kim

(10) Patent No.: US 8,847,848 B2
(45) Date of Patent: Sep. 30, 2014

(54) DISPLAY APPARATUS AND CONTROL METHOD THEREOF

(75) Inventor: Jae-cheol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1356 days.

(21) Appl. No.: 12/169,961

(22) Filed: Jul. 9, 2008

(65) Prior Publication Data

US 2009/0147130 A1 Jun. 11, 2009

(30) Foreign Application Priority Data

Dec. 11, 2007 (KR) ........................ 10-2007-0128248

(51) Int. Cl.
*G06F 3/14* (2006.01)
*G09G 5/00* (2006.01)
G09G 5/393 (2006.01)
G09G 5/395 (2006.01)

(52) U.S. Cl.
CPC ............ *G09G 5/003* (2013.01); *G09G 2352/00* (2013.01); *G09G 2340/0407* (2013.01); *G06F 3/1446* (2013.01); *G09G 2360/18* (2013.01); *G09G 5/393* (2013.01); *G09G 2310/0221* (2013.01); *G09G 5/395* (2013.01)
USPC .............................. 345/1.3; 345/1.1; 348/383

(58) Field of Classification Search
CPC .......................... G06F 3/1438; G09G 2360/18
USPC ......... 345/1.1, 1.3; 348/383, E9.027, E5.133, 348/308, E3.021, E3.032
See application file for complete search history.

(56) References Cited

U.S. PATENT DOCUMENTS

| 6,175,440 B1 | 1/2001 | Conemac |
| 6,501,441 B1 * | 12/2002 | Ludtke et al. .................. 345/1.1 |
| 6,774,868 B1 | 8/2004 | Bowen |
| 7,626,587 B1 * | 12/2009 | de Waal et al. ............... 345/536 |
| 8,022,922 B2 | 9/2011 | Kang |
| 2001/0052902 A1 * | 12/2001 | Ono et al. ...................... 345/502 |
| 2002/0030648 A1 * | 3/2002 | Yamamoto et al. ............. 345/87 |
| 2002/0154089 A1 * | 10/2002 | Yamazaki et al. ............. 345/103 |
| 2006/0232544 A1 * | 10/2006 | Sakashita ...................... 345/102 |

(Continued)

FOREIGN PATENT DOCUMENTS

KR 10-2007-0045045 A 5/2007
WO 95/13601 A1 5/1995

OTHER PUBLICATIONS

European Search Report issued in corresponding European Patent Application No. 08166010.2 on Apr. 15, 2011.

(Continued)

*Primary Examiner* — Priyank Shah
(74) *Attorney, Agent, or Firm* — Sughrue Mion, PLLC

(57) ABSTRACT

A display apparatus and a control method of the display apparatus are provided. The display apparatus includes a display panel which is partitioned into a plurality of panel areas; a storage unit which stores a video frame comprising a plurality of video areas; an operating unit which controls the display panel so that the video frame is displayed on the display panel; and a data reading unit which reads a portion of a video area and a portion of another video area from among the plurality of video areas stored in the storage unit, and transfers the read portions to the operating unit so that the read portions are displayed on one of the plurality of panel areas of the display panel.

21 Claims, 6 Drawing Sheets

(56) References Cited

U.S. PATENT DOCUMENTS

2007/0091059 A1    4/2007  Kang
2007/0171229 A1*   7/2007  Mamiya et al. ............... 345/503
2008/0001906 A1*   1/2008  Wang ........................... 345/102

OTHER PUBLICATIONS

Communication, dated Dec. 18, 2013, issued by the Korean Intellectual Property Office in counterpart Korean Patent Application No. 10-2007-0128248.

* cited by examiner

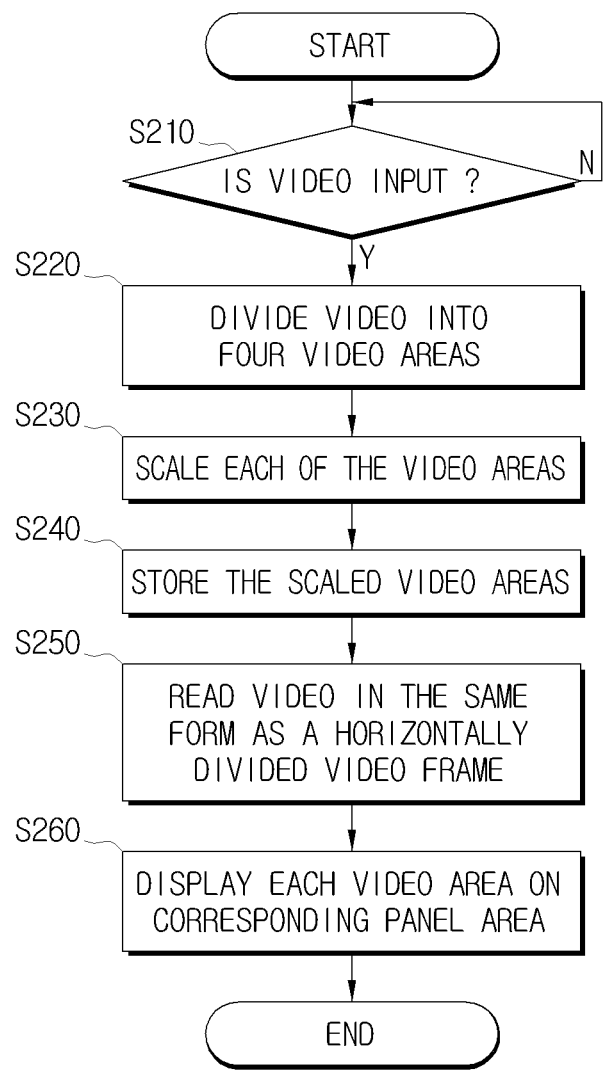

DISPLAY APPARATUS AND CONTROL METHOD THEREOF

CROSS-REFERENCE TO RELATED APPLICATIONS

This application claims priority from Korean Patent Application No. 10-2007-0128248, filed on Dec. 11, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing a display apparatus and controlling the display apparatus, and more particularly, to providing a display apparatus having a display panel, and controlling the display apparatus to display a video on the display panel.

2. Description of the Related Art

Display apparatuses generally function to display data visually. Plate type display apparatuses such as plasma display panels (PDPs) or liquid crystal displays (LCDs) have an excellent image quality and other qualities, so these have been widely employed for televisions (TVs) or monitors. Additionally, development and research on PDPs or LCDs have been continuing in recent years with the aim of producing a new generation of display apparatuses.

As screens of display apparatuses increase in size, the frame rate of display apparatuses employing a previously-used frequency when displaying a video on display panels may be reduced. Additionally, a problem arises in that a frequency higher than a currently-used frequency needs to be used in order to increase the frame rate.

However, it is not easy to operate display apparatuses using a high frequency, and electromagnetic interference (EMI) may occur even if a video is displayed using a high frequency.

Therefore, a display panel partitioned into a plurality of panel areas and a method for displaying a video on each of the plurality of panel areas have been studied.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus having a display panel partitioned into a plurality of panel areas, which is capable of dividing video into a plurality of video areas and displaying the video to provide high quality video, and a control method of the display apparatus.

According to an aspect of the present invention, there is provided a display apparatus comprising a display panel which is partitioned into a plurality of panel areas; a storage unit which stores a video frame comprising a plurality of video areas; an operating unit which controls the display panel so that the video frame is displayed on the display panel; and a data reading unit which reads a portion of a video area and a portion of another video area from among the plurality of video areas stored in the storage unit and which transfers each of the read portions to the operating unit so that the read portions are displayed on one of the plurality of panel areas of the display panel.

The plurality of video areas may comprise a first video area, a second video area, a third video area and a fourth video area which are disposed on upper left, upper right, lower left and lower right quadrants of the video frame, respectively.

The display panel may be partitioned horizontally into a first panel area, a second panel area, a third panel area and a fourth panel area.

The data reading unit may comprise a first read controller which reads a portion of the first video area and a portion of the third video area; a second read controller which reads other portions of the first video area and other portions of the third video area; a third read controller which reads a portion of the second video area and a portion of the fourth video area; and a fourth read controller which reads other portions of the second video area and other portions of the fourth video area.

The operating unit may control the display panel so that data read by the first read controller, second read controller, third read controller and fourth read controller may be displayed on the first panel area, second panel area, third panel area and fourth panel area, respectively.

The operating unit may comprise a data operating unit which supplies video received from the data reading unit to a data line of the display panel, the data operating unit being disposed on a first edge of the display panel; and a gate operating unit which supplies a scan signal to a gate line of the display panel, the gate operating unit being disposed on a second edge of the display panel. The first edge and the second edge may be adjacent to each other.

The display apparatus may comprise a single data operating unit and a single gate operating unit.

According to another aspect of the present invention, there is provided a control method of a display apparatus, which displays a video frame on a display panel partitioned into a plurality of panel areas, the control method comprising storing the video frame comprising a plurality of video areas; reading a portion of a video area and a portion of another video area from among the plurality of stored video areas; and displaying the read portions on one of the plurality of panel areas of the display panel.

The plurality of video areas may comprise a first video area, a second video area, a third video area and a fourth video area which are disposed on upper left, upper right, lower left and lower right quadrants of the video frame, respectively.

The display panel may be partitioned horizontally into a first panel area, a second panel area, a third panel area and a fourth panel area.

The reading may comprise a first operation of reading a portion of the first video area and a portion of the third video area; a second operation of reading other portions of the first video area and other portions of the third video area; a third operation of reading a portion of the second video area and a portion of the fourth video area; and a fourth operation of reading other portions of the second video area and other portions of the fourth video area.

The first to fourth steps of reading may be performed simultaneously.

The displaying may comprise displaying data read by the first read controller, second read controller, third read controller and fourth read controller on the first panel area, second panel area, third panel area and fourth panel area, respectively.

According to another aspect of the present invention, there is provided a display apparatus comprising a display panel which is partitioned into a plurality of panel areas; a storage unit which stores a video frame; an operating unit which controls the display panel so that the video frame is displayed on the display panel; and a data reading unit which reads the video frame stored in the storage unit in the same form as the partitioned display panel and which transfers the read video frame to the operating unit.

The display panel may be partitioned horizontally into a first panel area, a second panel area, a third panel area and a fourth panel area.

The video frame may be stored in the storage unit in a form differing from the partitioned display panel.

According to another aspect of the present invention, there is provided a control method of a display apparatus comprising a display panel partitioned into a plurality of panel areas, the control method comprising storing a video frame; reading the stored video frame in the same form as the partitioned display panel; and displaying the read video frame on the display panel.

The display panel may be partitioned horizontally into a first panel area, a second panel area, a third panel area and a fourth panel area.

The storing may comprise storing the video frame in a form differing from the partitioned display panel.

BRIEF DESCRIPTION OF THE DRAWINGS

The above and/or other aspects of the present invention will be more apparent by describing certain exemplary embodiments of the present invention with reference to the accompanying drawings, in which:

FIG. 2 is a flowchart illustrating a process for converting video divided into upper and lower left and right quadrants into video divided horizontally and displaying the converted video on a display panel, according to an exemplary embodiment of the present invention.

DETAILED DESCRIPTION OF EXEMPLARY EMBODIMENTS

Figure 1:
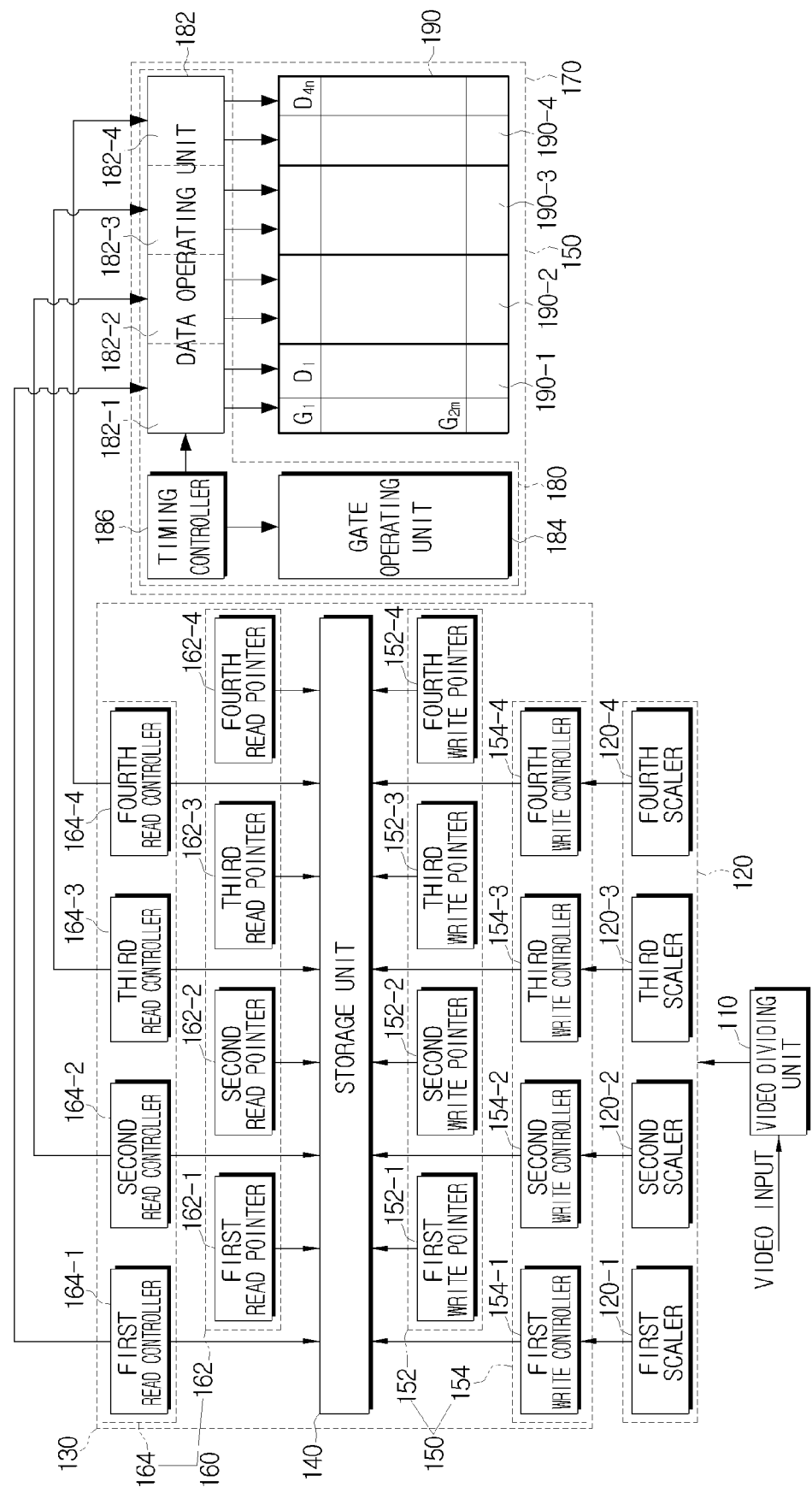
FIG. 1 is a block diagram of a display apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a display apparatus according to an exemplary embodiment of the present invention. The display apparatus of FIG. 1 comprises a video dividing unit 110, a scaler 120, a video converting unit 130 and a display unit 170.

The video dividing unit 110 divides an input video into a plurality of video areas. The video input to the video dividing unit 110 may desirably, but not necessarily, be frame-based. Additionally, the video dividing unit 110 may desirably, but not necessarily, divide the input video into upper-left, upper-right, lower-left and lower-right quadrants.

Figure 3A:
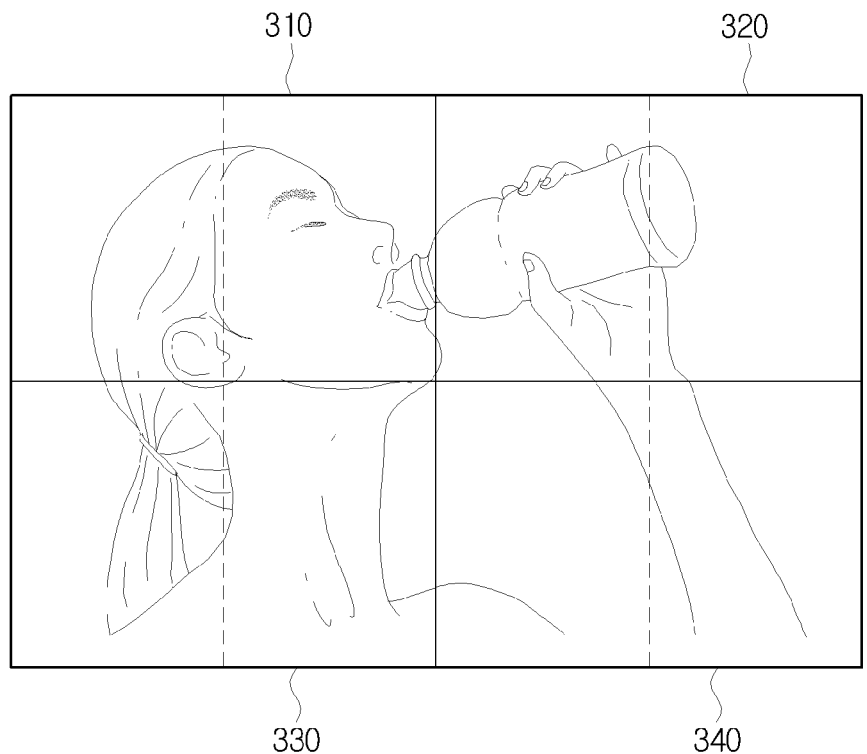
FIGS. 3A to 3E are diagrams further illustrating the process for converting video divided into upper and lower left and right quadrants to display the converted video on a display panel divided horizontally, according to an exemplary embodiment of the present invention.

In order to facilitate description of the present invention, the upper left, upper right, lower left and lower right video areas of the frame-based video are referred to as video area I 310, video area II 320, video area III 330 and video area IV 340, respectively, as shown in FIG. 3A.

Figure 3B:
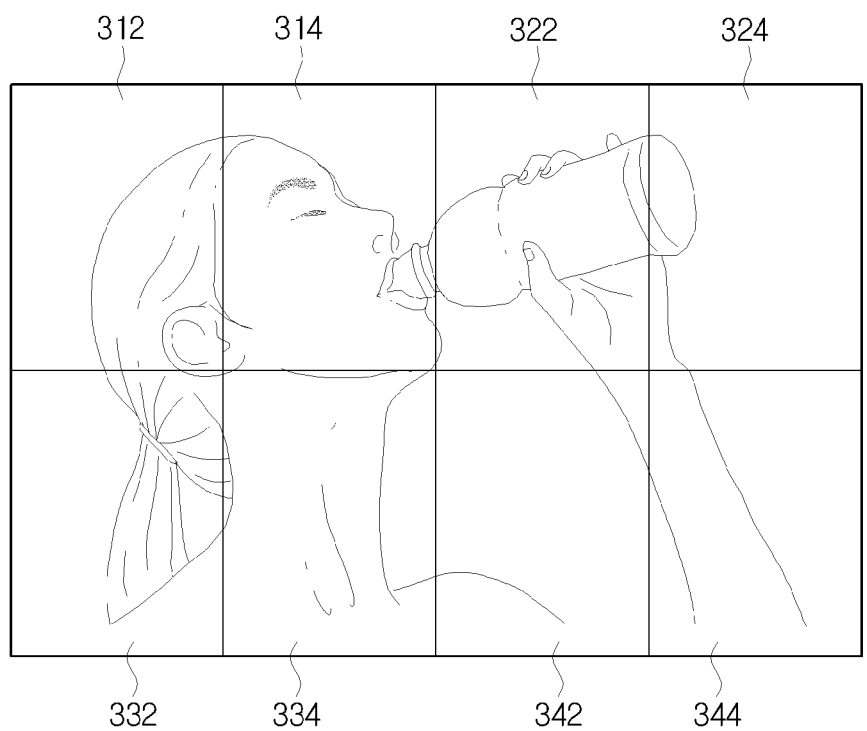

The left half and the right half of the video area I 310 are referred to as video area I-1 312 and video area I-2 314, respectively, and the left half and the right half of the video area II 320 are referred to as video area II-3 322 and video area II-4 324, respectively, as shown in FIG. 3B. Additionally, the left half and the right half of the video area III 330 are referred to as video area III-1 332 and video area III-2 334, respectively, and the left half and the right half of the video area IV 340 are referred to as video area IV-3 342 and video area IV-4 344, respectively.

Figure 3C:
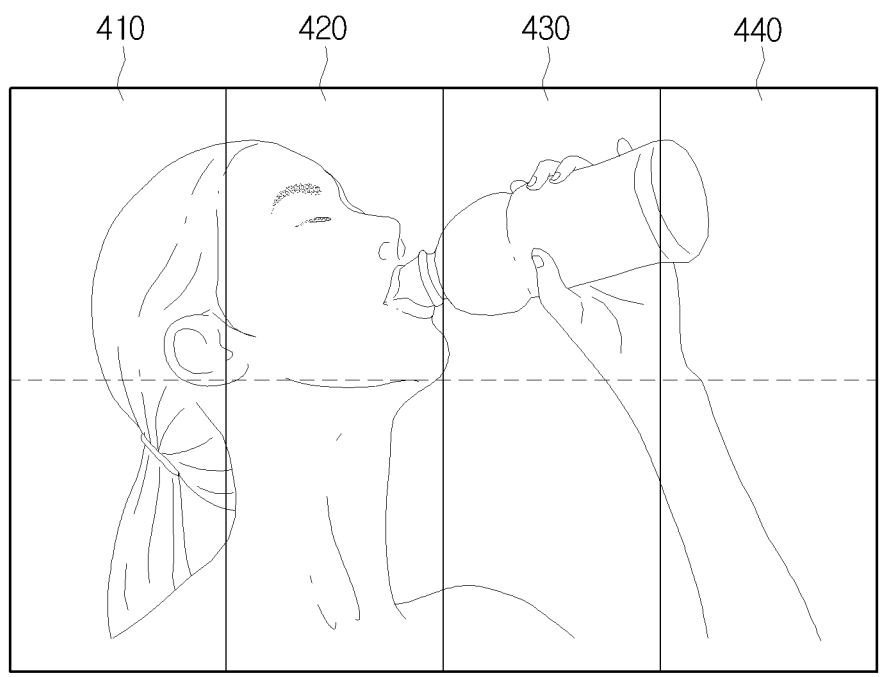

The video area I-1 312 and video area III-1 332 are combined to form a first video area 410; the video area I-2 314 and video area III-2 334 are combined to form a second video area 420; the video area II-3 322 and video area IV-3 342 are combined to form a third video area 430; and video area II-4 324 and video area IV-4 344 are combined to form a fourth video area 440, as shown in FIG. 3C.

The video dividing unit 110 may divide an input frame-based video into video areas I 310 to IV 340.

The scaler 120 adjusts the size of the input video so that the input video fits onto a screen to be displayed, and converts the resolution of the input video into a resolution identical to that of the display apparatus.

In this exemplary embodiment of the present invention, the scaler 120 may desirably, but not necessarily, comprise four sub-scalers, namely a first scaler 120-1, a second scaler 120-2, a third scaler 120-3 and a fourth scaler 120-4, in order to convert the resolution of the four video areas. The first to fourth scalers 120-1 to 120-4 may scale the video areas I 310 to IV 340, respectively.

The video converting unit 130 converts the video areas output from the scaler 120 into video areas having identical form to panel areas into which a display panel 190 is divided, and outputs the converted video areas to the display unit 170. The video converting unit 130 comprises a storage unit 140, a data recording unit 150 and a data reading unit 160.

The storage unit 140 temporarily stores the video. The video stored in the storage unit 140 may desirably, but not necessarily, be frame-based.

The data recording unit 150 stores the video output from the scaler 120 in the storage unit 140. The data recording unit 150 comprises four write pointers 152-1 to 152-4 and four write controllers 154-1 to 154-4. The first write pointer 152-1 indicates an address, namely, a location at which the video area I 310 is to be stored in the storage unit 140, and the first write controller 154-1 then stores the video area I 310 at the address indicated by the first write pointer 152-1. Similarly, the second, third and fourth write pointers 152-2, 152-3 and 152-4 indicate addresses at which the video areas II 320, III 330 and IV 340 are to be stored in the storage unit 140, respectively, and the second, third and fourth write controllers 154-2, 154-3 and 154-4 store the video areas II 320, III 330 and IV 340 at the addresses indicated by the second, third and fourth write pointers 152-2, 152-3 and 152-4.

The data reading unit 160 reads the video stored in the storage unit 140. The data reading unit 160 comprises four read pointers 162-1, 162-2, 162-3 and 162-4 and four read controllers 164-1, 164-2, 164-3 and 164-4. The first read pointer 162-1 indicates an address at which a video area to be displayed on a first panel area 190-1 of the display panel 190 is stored. The first read controller 164-1 then reads the video area stored at the address indicated by the first read pointer 162-1, and transfers the read video area to the display unit 170.

In the same manner as described above, the second, third and fourth read pointers 162-2, 162-3 and 162-4 indicate addresses at which video areas to be displayed on a second panel area 190-2, third panel area 190-3 and fourth panel area 190-4 of the display panel 190 are stored, and the second, third and fourth read controllers 164-2, 164-3 and 164-4 then read the video areas stored in the addresses indicated by the second, third and fourth read pointers 162-2, 162-3 and 162-4, respectively, and transfers the read video areas to the display unit 170. Each of the first to fourth write controllers 154-1 to 154-4 may simultaneously receive the respective video areas from the first to fourth scalers 120-1 to 120-4, and may store the received video areas in the storage unit 140.

As described above, the video converting unit 130 converts a video comprising upper-left, upper-right, lower-left and lower-right quadrants into a horizontally divided video, and outputs the converted video. To achieve this, a process for indicating addresses of the storage unit 140 to store the video may differ from a process for indicating addresses of the storage unit 140 to read the video.

The display unit 170 displays the video, and comprises the display panel 190 and an operating unit 180.

The display panel 190 is a device on which the video is displayed. 2m×4n pixels are arranged in matrix form on the display panel 190. 2m data lines, namely $D_1$ to $D_{2m}$, and 4n gate lines, namely $G_1$ to $G_{4n}$, cross, and a thin film transistor (TFT) is disposed on an area where the data lines and gate lines cross.

The display panel 190 may be partitioned into a plurality of panel areas. In this exemplary embodiment of the present invention, the display panel 190 is horizontally partitioned into four equal panel areas, namely the first panel area 190-1, second panel area 190-2, third panel area 190-3 and fourth panel area 190-4.

Each of the plurality of panel areas includes 2m×n pixels arranged in matrix form, wherein n data lines, namely D1 to $D_n$, and 2m gate lines, namely G1 to $G_{2m}$, cross, and TFTs are disposed on areas where the data lines and gate lines cross.

The TFT included in the display panel 190 performs a switching operation in response to scan signals supplied from the gate lines and data signals supplied from the data lines.

The first panel area 190-1 is represented by the first pixel to n-th pixel horizontally, the second panel area 190-2 is represented by the n+1-th pixel to 2n-th pixel horizontally, the third panel area 190-3 is represented by the 2n+1-th pixel to 3n-th pixel horizontally, and the fourth panel area 190-4 is represented by the 3n+1-th pixel to 4n-th pixel horizontally.

The first to fourth video areas 410 to 440 are displayed on the first to fourth panel areas 190-1 to 190-4, respectively. The first to fourth video areas 410 to 440 may be formed by combination of the video areas I 310 to IV 340, respectively, detailed description of which will be given later.

The operating unit 180 comprises a data operating unit 182 which supplies data signals to the data lines, a gate operating unit 184 which supplies scan signals to the gate lines, and a timing controller 186 which controls the data operating unit 182 and gate operating unit 184 using synchronizing signals.

The data operating unit 182 may desirably, but not necessarily, be disposed on the top or bottom of the display panel 190, and the gate operating unit 184 may desirably, but not necessarily, be disposed on the left or right side of the display panel 190.

The timing controller 186 generates a first control signal to control the data operating unit 182 using a vertical synchronizing signal, and a second control signal to control the gate operating unit 184 using a horizontal synchronizing signal.

The data operating unit 182 converts the digital video data transferred from the video converting unit 130 into analog data and supplies the converted analog data to the data lines, in response to the first control signal from the timing controller 186.

The gate operating unit 184 sequentially supplies scan pulse signals to the gate lines and selects horizontal lines of the display panel 190 to which the data signals are supplied, in response to the second control signal from the timing controller 186.

The data operating unit 182 may desirably, but not necessarily, be a single device physically, but may be divided into a first data operating unit 182-1, a second data operating unit 182-2, a third data operating unit 182-3 and a fourth data operating unit 182-4, to which the first to fourth read controllers 164-1 to 164-4 are respectively connected.

In more detail, each of the first to fourth data operating units 182-1 to 182-4 may receive the respective video area from the first to fourth read controllers 164-1 to 164-4, via one or two wires.

However, the first to fourth data operating units 182-1 to 182-4 may supply data signals to the display panel 190 sequentially and simultaneously using the same vertical synchronizing signal, rather than separately and individually using vertical synchronizing signals.

Accordingly, the first to fourth data operating units 182-1 to 182-4 may desirably, but not necessarily, be combined in a single device physically and electrically. Also, the gate operating unit 184 may desirably, but not necessarily, be a single device physically and electrically.

Hereinafter, a process by which the display apparatus of FIG. 1 converts a video divided into upper-left, upper-right, lower-left and lower-right quadrants into a video divided horizontally, and displays the converted video will be described in detail with reference to FIGS. 2 to 3E. FIG. 2 is a flowchart illustrating a process for converting a video divided into upper-left, upper-right, lower-left and lower-right quadrants into a video divided horizontally, and displaying the converted video on the display panel 190, according to an exemplary embodiment of the present invention. FIGS. 3A to 3E diagrams illustrates the process for converting a video divided into upper-left, upper-right, lower-left and lower-right quadrants to display the converted video on the display panel 190 partitioned horizontally, according to an exemplary embodiment of the present invention.

In FIG. 2, if a video is input (operation S210-Y), the video dividing unit 110 may divide the input video into four video areas (operation S220). Here, the input video may desirably, but not necessarily, be frame-based. The video dividing unit 110 may desirably, but not necessarily, divide the input video into upper-left, upper-right, lower-left and lower-right quadrants to obtain the video areas I 310 to IV 340. The four video areas 310 to 340 may be output to the scaler 120.

FIG. 3A shows a video frame divided into upper-left, upper-right, lower-left and lower-right quadrants. The video frame of FIG. 3A is divided into a video area I 310, a video area II 320, a video area III 330 and a video area IV 340 which correspond to the upper left, upper right, lower left and lower right quadrants of the video frame, respectively.

FIG. 3B shows a video frame in which each video area of the video frame of FIG. 3A is divided into the left and right parts. In FIG. 3B, the video area I 310 is divided into the video area I-1 312 on the left part and the video area I-2 314 on the right part, and the video area II 320 is divided into the video area II-3 322 on the left part and the video area II-4 324 on the right part. Additionally, the video area III 330 is divided into the video area III-1 332 on the left part and the video area III-2 334 on the right part, and the video area IV 340 is divided into the video area IV-3 342 on the left part and the video area IV-4 344 on the right part.

FIG. 3C shows a video frame in which the video of 3A is divided into quarters horizontally. In FIG. 3C, the first video area 410 comprises the video area I-1 312 and video area III-1 332; the second video area 420 comprises the video area I-2 314 and video area III-2 334; the third video area 430 comprises the video area II-3 322 and video area IV-3 342; and the fourth video area 440 comprises the video area II-4 324 and video area IV-4 344.

Back to FIG. 1, the video dividing unit 110 may divide the video frame into the video areas I 310 to IV 340, as shown in FIG. 3A.

The scaler 120 may scale each of the video areas (operation S230). Since the scaler 120 comprises the sub-scalers, namely the first to fourth scalers 120-1 to 120-4, the sub-scalers may desirably, but not necessarily, scale the video areas I 310 to IV 340, respectively. If the display apparatus according to the exemplary embodiment of the present invention has a resolution of 2m×4n, each of the sub-scalers 120-1 to 120-4 may convert the resolution of each respective video area to a resolution of m×2n.

The data recording unit 150 may store the scaled video areas 310 to 340 in the storage unit 140 (operation S240). The first to fourth write controllers 154-1 to 154-4 of the data recording unit 150 may store the video areas I 310 to IV 340, respectively, in the storage unit 140 using the first to fourth write pointers 152-1 to 152-4. In this situation, the first to fourth write controllers 154-1 to 154-4 may desirably, but not necessarily, simultaneously store the video areas I 310 to IV 340, respectively.

In more detail, if addresses of the storage unit 140 are assigned so that each pixel data is stored at each address, the first write pointer 152-1 may initially be set to indicate the lowest address of the storage unit 140, namely the first address. Additionally, the second write pointer 152-2 may indicate the (m×2n+1)-th address of the storage unit 140, the third write pointer 152-3 may indicate the (2m×2n+1)-th address of the storage unit 140, and the fourth write pointer 152-4 may indicate the (3m×2n+1)-th address of the storage unit 140. The first to fourth write pointers 152-1 to 152-4 may indicate addresses following the indicated addresses every time pixel data is stored one by one.

Accordingly, the first write pointer 152-1 may indicate a range between the first address and the (m×2n)-th address of the storage unit 140 in which the last pixel data of the video area I 310 is to be stored. The second write pointer 152-2 may indicate a range between the (m×2n+1)-th address and (2m×2n)-th address of the storage unit 140 in which the last pixel data of the video area III 330 is to be stored. The third write pointer 152-3 may indicate a range between the (2m×2n+1)-th address and (3m×2n)-th address of the storage unit 140 in which the last pixel data of the video area II 320 is to be stored. Additionally, the fourth write pointer 152-4 may indicate a range between the (3m×2n+1)-th address and (4m×2n)-th address of the storage unit 140 in which the last pixel data of the video area IV 340 is to be stored.

Each of the first to fourth write controllers 154-1 to 154-4 may store the respective video areas I 310 to IV 340 pixel by pixel in the addresses indicated by the first to fourth write pointers 152-1 to 152-4.

Figure 3D:
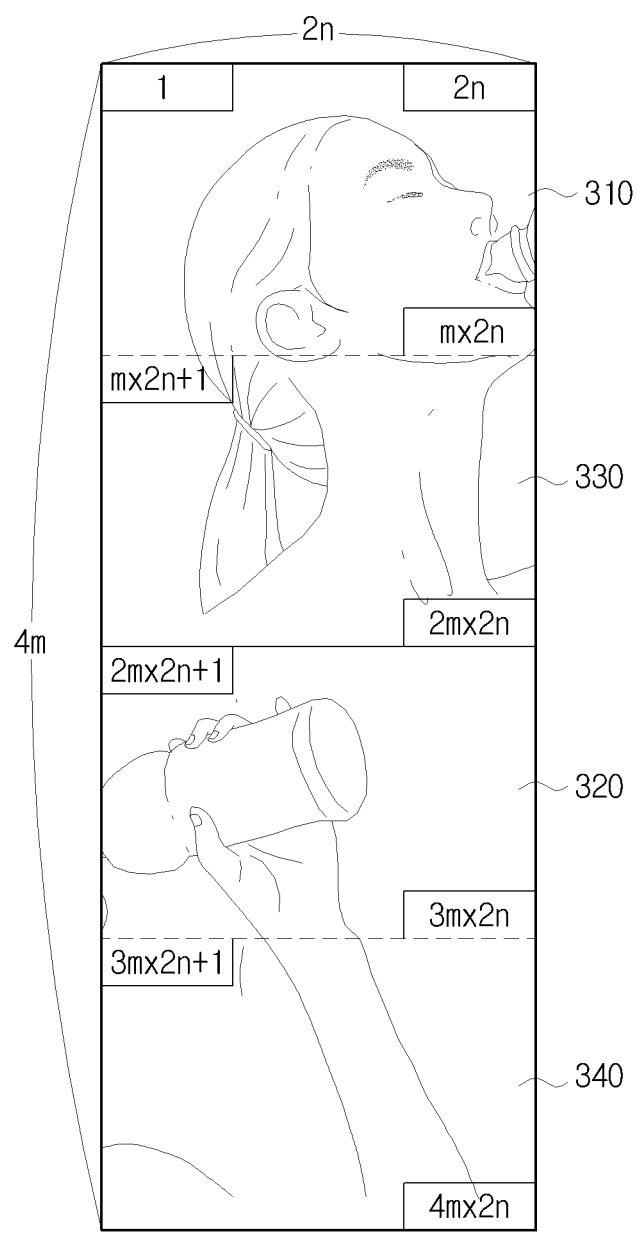
Figure 3E:
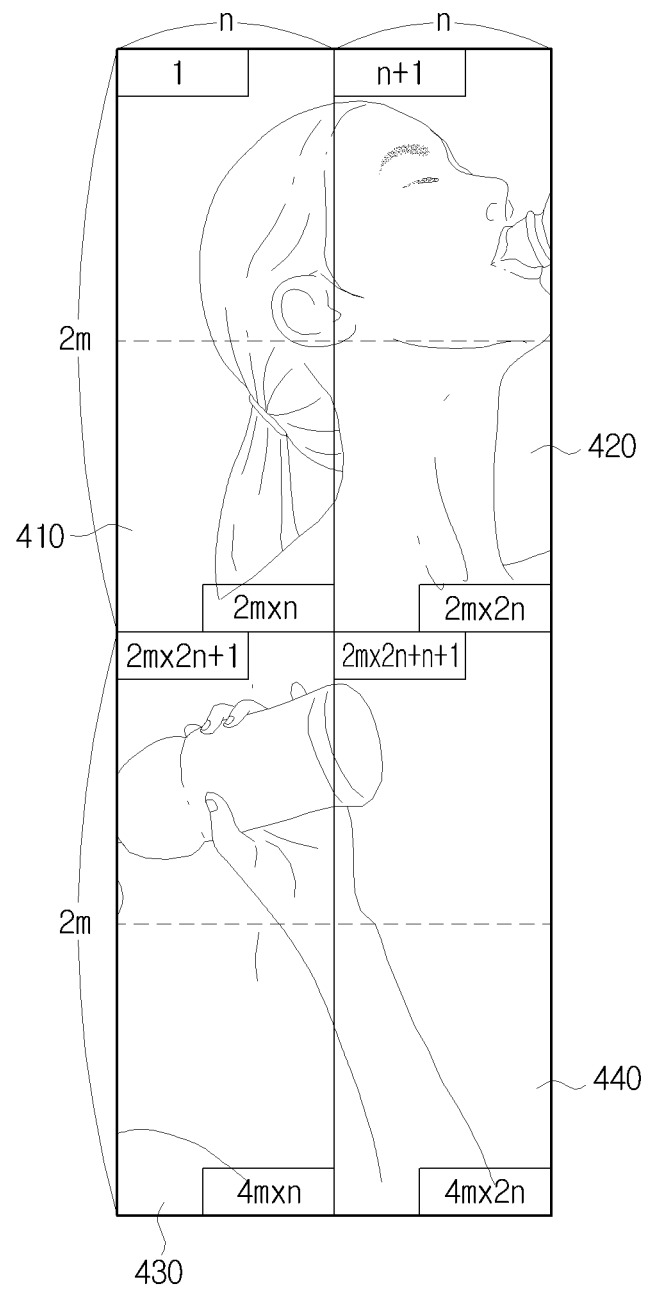

FIG. 3D schematically shows the video frame being stored in the storage unit 140. The first address to the (4m×2n)-th address are assigned to the upper left to the lower right of the storage unit 140 so that the assigned addresses increase one by one. (Here, 4m×2n is identical to 2m×4n, but those are described in different forms for convenience of description in this exemplary embodiment of the present invention.) Therefore, the video area I 310 may be stored in the first address to the (m×2n)-th address of the storage unit 140, and the video area III 330 may be stored in the (m×2n+1)-th address to the (2m×2n)-th address of the storage unit 140. Additionally, the video area TI 320 may be stored in the (2m×2n+1)-th address to the (3m×2n)-th address of the storage unit 140, and the video area IV 340 may be stored in the (3m×2n+1)-th address to the (4m×2n)-th address of the storage unit 140.

The data reading unit 160 may read the video frame stored in the storage unit 140 in the same form as a horizontally divided video frame (operation S250). Specifically, the first read pointer 162-1 may initially be set to indicate the lowest address of the storage unit 140, namely the first address. Additionally, the second read pointer 162-2 may indicate the (n+1)-th address of the storage unit 140, the third read pointer 162-3 may indicate the (2m×2n+1)-th address of the storage unit 140, and the fourth read pointer 162-4 may indicate the (2m×2n+n+1)-th address of the storage unit 140. Each of the first to fourth read pointers 162-1 to 162-4 may increase each address by n times every time pixel data is stored. However, after the n-th pixel data is stored, each of the first to fourth read pointers 162-1 to 162-4 may skip n addresses following the address at which the n-th pixel data is stored, and may indicate addresses following the omitted addresses. In this manner, the first to fourth read pointers 162-1 to 162-4 may indicate 2m×2n addresses.

For example, the first read pointer 162-1 may initially be set to indicate the first address, and may then indicate addresses following the first address by increasing each address every time pixel data is stored. In this situation, the first read pointer 162-1 may indicate a range between the first address and the n-th address, and may then indicate a range between the (2n+1)-th address and the (2n+n)-th address rather than a range between the (n+1)-th address and the 2n-th address. Subsequently, the first read pointer 162-1 may indicate a range between the (2×2n+1)-th address and the (2×2n+n)-th address. Accordingly, the first read pointer 162-1 may indicate a range between the ((2m−1)×2n+1)-th address and the ((2m−1)×2n+n)-th address.

The first read pointer 162-1 may indicate an address at which the video area I-1 312 and video area III-1 332 to be combined to form the first video area 410 are stored. The first read controller 164-1 may then read the first video area 410, and transfer the read video area to the display unit 170. Additionally, the second read pointer 162-2 may indicate an address at which the video area I-2 314 and video area III-2 334 to be combined to form the second video area 420 are stored. The second read controller 164-2 may then read the second video area 420, and transfer the read video area to the display unit 170. In the same manner as described above, the third and fourth read controllers 164-3 and 164-4 may read the third video area 430 and the fourth video area 440 from the storage unit 140, respectively, and may transfer the read video areas to the display unit 170.

Hence, the read controllers 164-1 to 164-4 of the data reading unit 160 may read the video areas stored in the storage unit 140 in the same form as video areas into which a video frame is divided horizontally.

FIG. 3E schematically shows a video frame in order to explain a process for reading the video frame stored in the storage unit 140. In FIG. 3E, the first read controller 164-1 may read the first video area 410 (namely, a combination of the video area I-1 312 and video area III-1 332) from the storage unit 140, and the second read controller 164-2 may read the second video area 420 (namely, a combination of the video area I-2 314 and video area III-2 334) from the storage unit 140. Additionally, the third read controller 164-3 and the fourth read controller 164-4 may read the third video area 430 and the fourth video area 440 from the storage unit 140, respectively.

Therefore, the data reading unit 160 may read the first to fourth video areas 410 to 440 into which the video frame is divided horizontally from the storage unit 140, and may transfer the read video areas to the display unit 170.

The display unit 170 may display each video area on a corresponding panel area (operation S260). In more detail, the first to fourth video areas 410 to 440 may be transferred to the first to fourth data operating units 182-1 to 182-4, respectively. The first to fourth data operating units 182-1 to 182-4 may sequentially supply the data signals to the first to fourth panel areas 190-1 to 190-4, respectively, in response to the same vertical synchronizing signal, so that the video may be displayed on the display panel 190.

As described above, when the display apparatus displays the video frame on the display panel 190 divided into the plurality of panel areas, the video frame may be divided into a plurality of video areas in the same form as the plurality of panel areas into which the display panel 190 is divided, and each of the video areas may appear on the corresponding panel area. Therefore, a high frequency is not required.

Additionally, the display panel 190 is partitioned only horizontally, and each of the video areas is displayed simultaneously using the same synchronizing signal, so only a single data operating unit 182 and a single gate operating unit 184 which supplies data signals and scan signals to the display panel 190 may be required.

Although the display panel 190 is partitioned horizontally in the exemplary embodiment of the present invention, the display panel 190 may be partitioned vertically. If the display panel 190 is partitioned vertically, the video converting unit 130 may convert the plurality of video areas of the video frame into a plurality of video areas into which the display panel 190 is divided vertically, and may display the converted video. Additionally, in this situation, the data operating unit 182 of the display unit 170 may be disposed on the left or right side of the display panel 190, and the gate operating unit 184 of the display unit 170 may be disposed on the top or bottom of the display panel 190.

Furthermore, the scaler 120 includes the plurality of subscalers 120-1 to 120-4 to scale the video areas in the exemplary embodiment of the present invention. However, it is also possible for a single scaler 120 to scale the video frame, so the scaled video frame may be stored in the storage unit 140.

Moreover, the video frame is divided and then scaled in the exemplary embodiment of the present invention, but the present invention is also applicable to a situation in which a plurality of video areas into which the video frame is divided are input from an external apparatus in advance before scaling. In this situation, the video dividing unit 110 may thus be unnecessary. Additionally, the present invention is also applicable to a situation in which the plurality of video areas into which the video frame is divided are input from an external apparatus after scaling, so the display apparatus may not require the scaler 120.

As described above, according to the exemplary embodiment of the present invention, a display apparatus provides video areas identical in form to a plurality of panel areas into which a display panel is divided, so it is possible to prevent the frame rate from being reduced even using a large scale display panel, and to display the video using a low frequency.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus comprising:
   a display panel which is partitioned into a plurality of panel areas;
   a storage unit which stores a video frame comprising a plurality of video areas;
   an operating unit which controls the display panel so that the video frame is displayed on the display panel; and
   one or more data reading units which read a portion of a video area and a portion of another video area from among the plurality of video areas stored in the storage unit, combine the portions read from different video areas to form a first video area according to a partitioned form of the display panel, and transfer the first video area to the operating unit so that the first video area is displayed on the display panel,
   wherein the operating unit comprises:
   a data operating unit which supplies the portions read by the data reading unit to a data line of the display panel, the data operating unit being disposed on a first edge of the display panel; and
   a gate operating unit which supplies a scan signal to a gate line of the display panel, the gate operating unit being disposed on a second edge of the display panel,
   wherein the first edge and the second edge are adjacent to each other, and
   wherein the data operating unit is controlled by a first control signal using a vertical synchronizing signal, and the gate operating unit is controlled by a second control signal using a horizontal synchronizing signal,
   wherein the one or more data reading units combine, in response to changing a shape of division of the display panel, areas read from the different video areas using a different method,
   wherein using the different method comprises using a first method for designating a location for storing an address of an image and a second method for reading the image according to the designated address.

2. The display apparatus of claim 1, wherein the plurality of video areas comprise a first video area, a second video area, a third video area and a fourth video area which are disposed on upper left, upper right, lower left and lower right quadrants of the video frame, respectively.

3. The display apparatus of claim 2, wherein the display panel is partitioned horizontally into a first panel area, a second panel area, a third panel area and a fourth panel area to constitute the plurality of panel areas of the display panel.

4. The display apparatus of claim 2, wherein the display panel is partitioned vertically into a first panel area, a second panel area, a third panel area and a fourth panel area to constitute the plurality of panel areas of the display panel.

5. The display apparatus of claim 3, wherein the data reading unit comprises:
   a first read controller which reads first data comprising a portion of the first video area and a portion of the third video area;
   a second read controller which reads second data comprising a remaining portion of the first video area and a remaining portion of the third video area;

a third read controller which reads third data comprising a portion of the second video area and a portion of the fourth video area; and a fourth read controller which reads fourth data comprising a remaining portion of the second video area and a remaining portion of the fourth video area, wherein the first to the fourth read data are displayed on the plurality of panel areas of the display panel.

6. The display apparatus of claim 5, wherein the operating unit controls the display panel so that the first to the fourth data read by the first to the fourth read controllers are displayed on the first to the fourth panel areas, respectively.

7. The display apparatus of claim 1, wherein a single data operating unit and a single gate operating unit are provided.

8. A control method of a display apparatus, which displays a video frame on a display panel partitioned into a plurality of panel areas, the control method comprising:

storing the video frame comprising a plurality of video areas;

reading a portion of a video area and a portion of another video area from among the plurality of stored video areas, combining the portions read from different video areas to form a first video area according to a partitioned form of the display panel, and transferring the first video area; and displaying the first video area on the display panel, wherein the reading comprises supplying the read portions to a data line of the display panel and supplying a scan signal to a gate line of the display panel, and wherein the supplying the read portions is controlled by a first control signal using a vertical synchronizing signal, and the supplying the scan signal is controlled by a second control signal using a horizontal synchronizing signal, wherein the reading comprises combining, in response to changing a shape of division of the display panel, areas read from the different video areas using a different method, wherein using the different method comprises using a first method for designating a location for storing an address of an image and a second method for reading the image according to the designated address.

9. The control method of claim 8, wherein the plurality of video areas comprise a first video area, a second video area, a third video area and a fourth video area which are disposed on upper left, upper right, lower left and lower right quadrants of the video frame, respectively.

10. The control method of claim 9, wherein the display panel is partitioned horizontally into a first panel area, a second panel area, a third panel area and a fourth panel area to constitute the plurality of panel areas of the display panel.

11. The control method of claim 9, wherein the display panel is partitioned vertically into a first panel area, a second panel area, a third panel area and a fourth panel area to constitute the plurality of panel areas of the display panel.

12. The control method of claim 10, wherein the reading comprises:

a first operation of reading first data comprising a portion of the first video area and a portion of the third video area;

a second operation of reading second data comprising a remaining portion of the first video area and a remaining portion of the third video area;

a third operation of reading third data comprising a portion of the second video area and a portion of the fourth video area; and a fourth operation of reading a remaining portion of the second video area and a remaining portion of the fourth video area, wherein the first to the fourth read data are displayed on the plurality of panel areas of the display panel.

13. The control method of claim 12, wherein the displaying comprises displaying the first to the fourth data read by the first to the fourth read controllers on the first to the fourth panel areas, respectively.

14. A display apparatus comprising:

a display panel which is partitioned into a plurality of panel areas;

a storage unit which stores video frames;

an operating unit which controls the display panel so that the video frame is displayed on the display panel; and one or more data reading units which read the video frames stored in the storage unit in a same form as the partitioned display panel and transfer the read video frames to the operating unit so that the video frames are displayed on the display panel simultaneously, wherein the one or more data reading units read a portion of a video area and a portion of another video area from among the plurality of video areas stored in the storage unit, combine the portions read from different video areas to form a first video area according to a partitioned form of the display panel, and transfer the first video area, wherein the operating unit comprises:

a data operating unit which supplies the portions read by the data reading unit to a data line of the display panel, the data operating unit being disposed on a first edge of the display panel; and a gate operating unit which supplies a scan signal to a gate line of the display panel, the gate operating unit being disposed on a second edge of the display panel, wherein the first edge and the second edge are adjacent to each other, and wherein the data operating unit is controlled by a first control signal using a vertical synchronizing signal, and the gate operating unit is controlled by a second control signal using a horizontal synchronizing signal, wherein the one or more data reading units combine, in response to changing a shape of division of the display panel, areas read from the different video areas using a different method, wherein using the different method comprises using a first method for designating a location for storing an address of an image and a second method for reading the image according to the designated address.

15. The display apparatus of claim 14, wherein the display panel is partitioned horizontally into a first panel area, a second panel area, a third panel area and a fourth panel area to constitute the plurality of panel areas of the display panel.

16. The display apparatus of claim 14, wherein the display panel is partitioned vertically into a first panel area, a second panel area, a third panel area and a fourth panel area to constitute the plurality of panel areas of the display panel.

17. The display apparatus of claim 14, wherein the video frame is stored in the storage unit in a form differing from the partitioned display panel.

18. A control method of a display apparatus comprising a display panel partitioned into a plurality of panel areas, the control method comprising:

storing a video frame;

reading the stored video frames in a same form as the partitioned display panel; and displaying the read video frames on the display panel simultaneously, wherein the reading comprises reading a portion of a video area and a portion of another video area from among a plurality of video areas stored in a storage unit, combining the portions read from different video areas to form a first video area according to a partitioned form of the display panel, and transferring the first video area, wherein the reading further comprises supplying the read portions to a data line of the display panel and supplying a scan signal to a gate line of the display panel, and wherein the supplying the read portions is controlled by a first control signal using a vertical synchronizing signal, and the supplying the scan signal is controlled by a second control signal using a horizontal synchronizing signal, wherein the reading comprises combining, in response to changing a shape of division of the display panel, areas read from the different video areas using a different method, wherein using the different method comprises using a first method for designating a location for storing an address of an image and a second method for reading the image according to the designated address.

19. The control method of claim 18, wherein the display panel is partitioned horizontally into a first panel area, a second panel area, a third panel area and a fourth panel area to constitute the plurality of panel areas of the display panel.

20. The control method of claim 18, wherein the display panel is partitioned vertically into a first panel area, a second panel area, a third panel area and a fourth panel area to constitute the plurality of panel areas of the display panel.

21. The control method of claim 18, wherein the storing comprises storing the video frame in a form differing from the partitioned display panel.

* * * * *